United States Patent
Berels et al.

(10) Patent No.: US 11,872,774 B2
(45) Date of Patent: Jan. 16, 2024

(54) INDEPENDENT CONDUCTIVE TAPE DISPENSING SYSTEM FOR MANUFACTURING OF ELECTRICAL DISTRIBUTION CIRCUITS IN VEHICLES

(71) Applicant: Ford Global Technologies, LLC, Dearborn, MI (US)

(72) Inventors: David Jeffeory Berels, Plymouth, MI (US); Mahmoud Yousef Ghannam, Canton, MI (US); Rajarshi Roychowdhury, Dearborn, MI (US); Scott Mayberry, East Point, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 491 days.

(21) Appl. No.: 17/035,823

(22) Filed: Sep. 29, 2020

(65) Prior Publication Data

US 2022/0097317 A1    Mar. 31, 2022

(51) Int. Cl.
| | |
|---|---|
| *B29C 65/00* | (2006.01) |
| *B29C 70/38* | (2006.01) |
| *H02G 1/06* | (2006.01) |
| *B65H 35/00* | (2006.01) |
| *H01B 7/08* | (2006.01) |
| *B29C 65/74* | (2006.01) |
| *B29C 65/48* | (2006.01) |
| *B29C 65/50* | (2006.01) |
| *B29C 65/78* | (2006.01) |

(52) U.S. Cl.
CPC ....... *B29C 70/388* (2013.01); *B65H 35/0033* (2013.01); *H02G 1/06* (2013.01); *B29C 65/48* (2013.01); *B29C 65/50* (2013.01); *B29C 65/5021* (2013.01); *B29C 65/7419* (2013.01); *B29C 65/7802* (2013.01); *H01B 7/0823* (2013.01)

(58) Field of Classification Search
CPC ..... B29C 65/48; B29C 65/50; B29C 65/5021; B29C 65/7419; B29C 65/7802; B29C 70/388; B65H 35/0033
See application file for complete search history.

(56) References Cited

U.S. PATENT DOCUMENTS

| | | | | |
|---|---|---|---|---|
| 3,992,240 A | * | 11/1976 | Kuehn, Jr. ............ | B29C 70/525 156/263 |
| 4,096,022 A | | 6/1978 | Crawford | |

(Continued)

*Primary Examiner* — Philip C Tucker
*Assistant Examiner* — Nickolas R Harm
(74) *Attorney, Agent, or Firm* — Burris Law, PLLC

(57) ABSTRACT

An apparatus for applying individual tapes in layers onto a substrate includes a plurality of reels, applicators, and a guide member. A first reel holds a first tape and a second reel holds a second tape. A first applicator includes a first pressure surface that receives the first tape from the first reel and presses the first tape in a direction toward the substrate to apply the first tape to the substrate. The second applicator includes a second pressure surface that receives the second tape from the second reel. The second pressure surface is aligned to dispense the second tape over a section of the first tape applied to the substrate and to press the second tape toward the substrate to apply the second tape over the first tape. The guide member is disposed between the reels and the applicators and aligns the first and second tapes during application.

20 Claims, 7 Drawing Sheets

(56) References Cited

U.S. PATENT DOCUMENTS

| | | | |
|---|---|---|---|
| 7,063,118 B2* | 6/2006 | Hauber | B29C 70/545 |
| | | | 156/367 |
| 8,425,710 B2* | 4/2013 | Anderson | B29C 70/386 |
| | | | 156/247 |
| 8,784,586 B2 | 7/2014 | Malik, Jr. | |
| 8,900,391 B2* | 12/2014 | Silcock | B29C 66/9241 |
| | | | 156/166 |
| 8,947,847 B2* | 2/2015 | Langone | B64D 45/02 |
| | | | 361/218 |
| 2009/0032195 A1* | 2/2009 | Slyne | B29C 70/388 |
| | | | 156/361 |
| 2009/0166467 A1* | 7/2009 | Hagman | B65H 35/0013 |
| | | | 242/562 |
| 2010/0230043 A1* | 9/2010 | Kisch | B29C 70/545 |
| | | | 156/256 |
| 2011/0203737 A1* | 8/2011 | Slyne | B29C 70/388 |
| | | | 156/358 |
| 2012/0097313 A1 | 4/2012 | Odawara et al. | |
| 2015/0122424 A1 | 5/2015 | Maus et al. | |
| 2016/0250836 A1* | 9/2016 | De Mattia | B29C 70/384 |
| | | | 156/247 |
| 2018/0111341 A1* | 4/2018 | Leborgne | B05D 7/52 |

\* cited by examiner

INDEPENDENT CONDUCTIVE TAPE DISPENSING SYSTEM FOR MANUFACTURING OF ELECTRICAL DISTRIBUTION CIRCUITS IN VEHICLES

FIELD

The present disclosure relates to electrical distribution circuits in vehicles and, more specifically, to a device and method for manufacturing electrical distribution circuits in a vehicle.

BACKGROUND

The statements in this section merely provide background information related to the present disclosure and may not constitute prior art.

The amount of wiring within vehicles is increasing as demand for electronic components, features, and sensors increases. Automotive electrical wiring can be difficult to package and assemble into a vehicle in locations hidden from view. Typically, electrical cables made up of wires are bundled and routed behind vehicle body panels and trim panels. The circuits made up by these cables can span long distances through the vehicle and can connect to components or sensors in remote locations on the vehicle. However, it can be difficult to fit all of the cables in the limited space behind such body and trim panels without reducing the space available to occupants and/or other components of the vehicle.

The present disclosure addresses these and other issues associated with manufacturing electrical circuits within vehicles.

SUMMARY

In one form, an apparatus for applying a plurality of individual tapes in layers onto a substrate includes a plurality of reels, a plurality of applicators, and at least one guide member. The plurality of reels includes a first reel configured to hold a first tape and a second reel configured to hold a second tape. The plurality of applicators includes a first applicator and a second applicator. The first applicator includes a first pressure surface configured to receive the first tape from the first reel and press the first tape in a direction toward the substrate to apply the first tape to the substrate. The second applicator includes a second pressure surface configured to receive the second tape from the second reel. The second pressure surface is aligned to dispense the second tape over a section of the first tape applied to the substrate and to press the second tape in the direction toward the substrate to apply the second tape to the substrate over the first tape. The at least one guide member is disposed between the plurality of reels and the plurality of applicators and configured to align the first and second tapes during application.

According to a variety of alternate forms: the apparatus further includes a first cutter disposed between the first reel and the first applicator and configured to cut the first tape, and a second cutter disposed between the second reel and the second applicator and configured to cut the second tape; the apparatus further includes a controller configured to control the first cutter and the second cutter independently of each other; the at least one guide member includes a first guide member that extends from the first reel toward the first applicator and a second guide member that extends from the second reel to the second applicator; the first guide member, the second guide member, or both the first guide member and the second guide member has a guide surface along which the first tape or the second tape slides and a guide wall that extends from the guide surface to define a guide track; the apparatus further includes the first tape and the second tape, wherein one of the first tape and the second tape is a conductive material and the other of the first tape and the second tape is a dielectric material; the first applicator includes a pair of first application rollers, wherein the first pressure surface is a cylindrical surface of one of the pair of first application rollers, wherein the pair of application first rollers are positioned to compress the first tape between the first pressure surface and a cylindrical surface of a second one of the pair of first application rollers, wherein the second applicator includes a pair of second application rollers, wherein the second pressure surface is a cylindrical surface of a one of the pair of second application rollers, wherein the pair of second application rollers are positioned to compress the second tape between the second pressure surface and a cylindrical surface of a second one of the pair of second application rollers; the first applicator further includes a first motor drivingly coupled to at least one roller of the pair of first application rollers, wherein the second applicator further includes a second motor drivingly coupled to at least one roller of the pair of second application rollers; the apparatus further includes a controller configured to control the first motor independently of the second motor; the apparatus further includes a pair of first feed rollers and a pair of second feed rollers, the first feed rollers being disposed between the first reel and the first cutter and configured to feed the first tape into the first cutter, at least one of the first feed rollers being motorized, the second feed rollers being disposed between the second reel and the second cutter and configured to feed the second tape into the second cutter, at least one of the second feed rollers being motorized; the first reel and the second reel are coaxially disposed about a reel axis, wherein each roller of the pair of first application rollers and each roller of the pair of second application rollers is disposed about a corresponding roller axis that is parallel to the reel axis; the first reel is configured to hold tape of a first width and the second reel is configured to hold tape of a second width that is greater than the first width; the plurality of reels includes a third reel configured to hold a third tape of a third width that is greater than the first width, wherein the plurality of applicators includes a third applicator including a third pressure surface configured to receive the third tape from the third reel and to press the third tape in the direction toward the substrate to apply the third tape to the substrate, wherein the first applicator is configured to align the first tape over a section of the third tape applied to the substrate, wherein the apparatus further comprising a third cutter configured to cut the third tape; the apparatus further includes the first tape, the second tape, and the third tape, wherein the third tape is a dielectric material, the first tape is a conductive material, and the second tape is a dielectric material.

According to another form, an apparatus for applying a plurality of individual tapes in layers onto a substrate includes a plurality of reels, a plurality of applicators, at least one guide ramp, a first cutter, and a second cutter. The plurality of reels includes a first reel holding a first tape wound about the first reel and a second reel holding a second tape wound about the second reel. The plurality of applicators includes a first applicator and a second applicator. The first applicator includes a first application roller and a first motor drivingly coupled to the first application roller and configured to draw the first tape from the first reel onto a first pressure surface of the first application roller. The first pressure surface being disposed about a first axis and configured to apply the first tape to the substrate. The second applicator including a second application roller and a second motor drivingly coupled to the second application roller and configured to draw the second tape from the second reel onto a second pressure surface of the second application roller. The second pressure surface being disposed about a second axis that is parallel to the first axis. The second pressure surface being aligned with the first pressure surface in an application direction to apply the second tape to the substrate over the first tape. The at least one guide ramp is disposed between the plurality of reels and the plurality of applicators and configured to align the first and second tapes during application. The first cutter is disposed between the first reel and the first applicator and configured to cut the first tape. The second cutter is disposed between the second reel and the second applicator and configured to cut the second tape. One of the first tape and the second tape is an electrically conductive material and the other of the first tape and the second tape is a dielectric material.

According to a variety of alternate forms: the apparatus further includes a controller in communication with the first motor, the second motor, the first cutter, and the second cutter, wherein the controller is configured to control the first motor and the second motor independently of each other and to control the first cutter and the second cutter independently of each other; the first reel and the second reel are coaxially disposed about a reel axis, wherein the first axis and the second axis are parallel to the reel axis; the apparatus further includes a pair of first feed rollers and a pair of second feed rollers, the first feed rollers being disposed between the first reel and the first cutter and configured to feed the first tape into the first cutter, at least one of the first feed rollers being motorized, the second feed rollers being disposed between the second reel and the second cutter and configured to feed the second tape into the second cutter, at least one of the second feed rollers being motorized; the plurality of reels includes a third reel holding a third tape wound about the third reel, wherein the plurality of applicators includes a third applicator including a third application roller and a third motor drivingly coupled to the third application roller and configured to draw the third tape from the third reel onto a third pressure surface of the third application roller, the third pressure surface being disposed about a third axis that is parallel to the first axis and the second axis, wherein the first pressure surface is aligned with the third pressure surface in the application direction and disposed between the second pressure surface and the third pressure surface in the application direction.

According to yet another form, a method of manufacturing an electrical circuit includes providing a substrate and drawing a plurality of tapes from a plurality of reels to a plurality of applicators. Each reel holds an individual tape of the plurality of tapes and each applicator receives a corresponding individual tape of the plurality of tapes. The method further includes pressing the plurality of applicators against the substrate and moving the plurality of applicators along an application direction while applying a first tape of the plurality of tapes from a first applicator of the plurality of applicators to the substrate and applying a second tape of the plurality of tapes from a second applicator of the plurality of applicators onto the first tape. One of the first tape and the second tape is a dielectric material and the other of the first tape and the second tape is a conductive material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
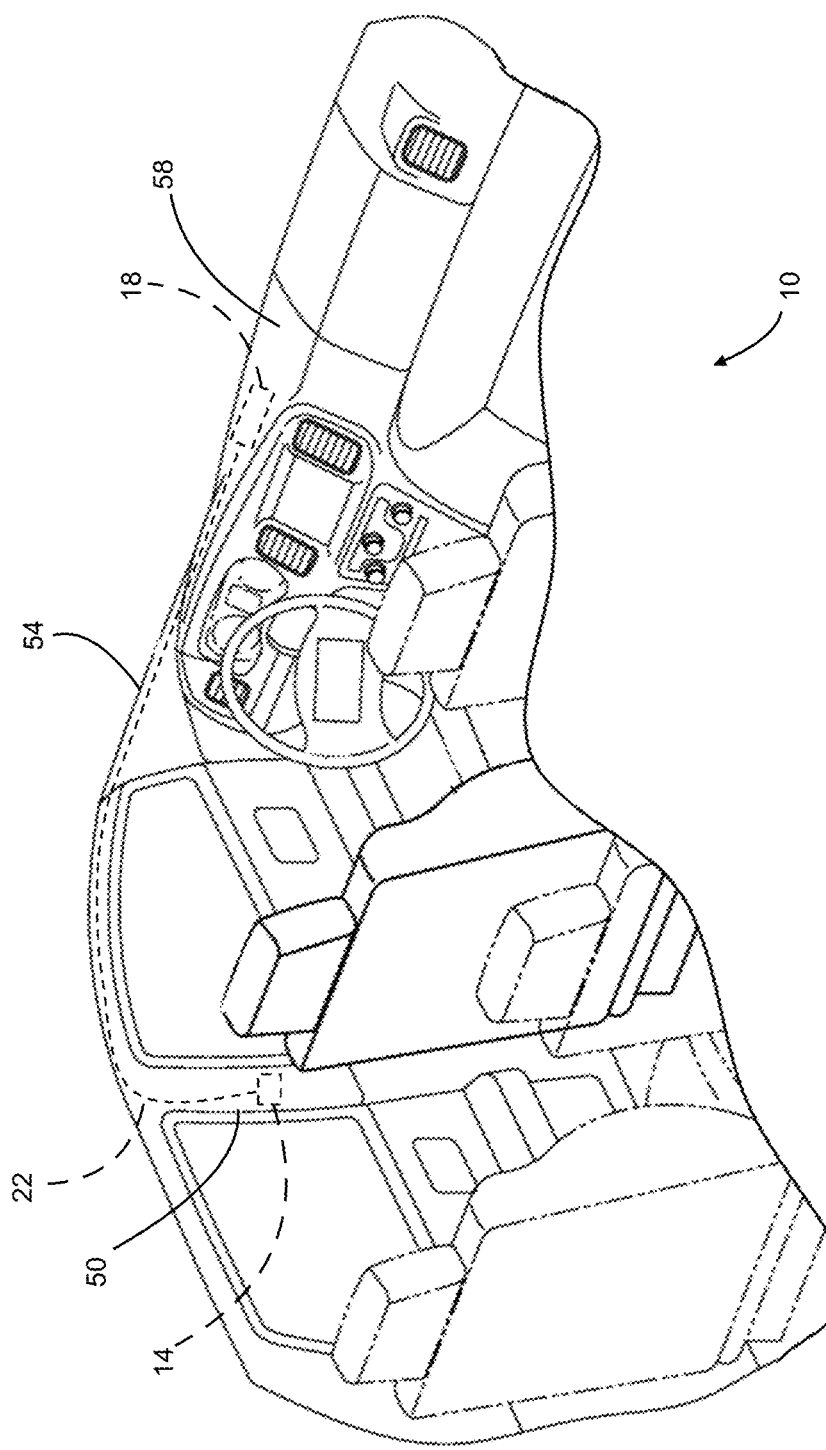
FIG. 1 is a perspective view of an interior of an example vehicle including a vehicle component with an electrical circuit in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example vehicle 10 is illustrated. The vehicle 10 has a first electronic component 14, a second electronic component 18, and an electrical leads portion 22 connecting the first electronic component 14 to the second electronic component 18. The first electronic component 14 can be any suitable component such as an electronic control unit (ECU), an electrical connector, an input-output device (e.g., infotainment system, radio, instrument cluster, HVAC controls), or electronically controlled vehicle system (e.g., lighting system, HVAC system,). The second electronic component 18 can be any suitable type of electronic component such as sensors, lights, speakers, input-output devices, etc. and is located spaced apart from the first electronic component 14. As described in greater detail below, the electrical leads portion 22 is integrated onto one or more vehicle panels such as a vehicle body panel or a trim panel. In the example provided, the electrical leads portion 22 is integrated into interior trim panels 50, 54, 58, though other configurations and/or routes through the vehicle can be used.

Figure 2:
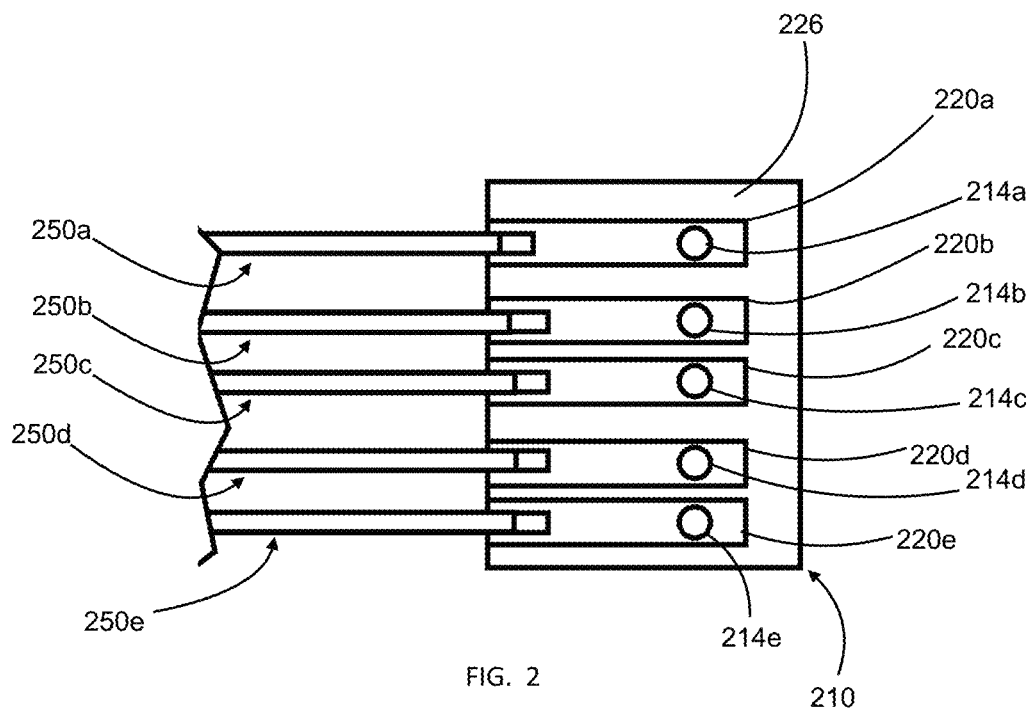
FIG. 2 is a top view of a terminal portion of the electrical circuit of FIG. 1 in accordance with the teachings of the present disclosure.

Referring to FIG. 2, a connector 210 of the electrical leads portion 22 is illustrated. In one form, the connector 210 can connect the first electronic component 14 (FIG. 1) to the electrical leads portion 22. In another form, the connector 210 can connect the second electronic component 18 (FIG. 1) to the electrical leads portion 22. In yet another form, the connector 210 can connect segments of the electrical leads portion 22 such as a portion of the electrical leads portion 22 along the panel 50 (FIG. 1) with a portion of the electrical leads portion 22 along the panel 54 for example.

The connector 210 includes a plurality of terminal pins 214a, 214b, 214c, 214d, 214e, a corresponding number of conductive traces 220a, 220b, 220c, 220d, 220e, and a dielectric platform or circuit board 226. The circuit board 226 is a dielectric material. In the example provided, the circuit board 226 is illustrated as being dedicated solely to the terminal pins 214a, 214b, 214c, 214d, 214e. In another configuration, not specifically shown, the circuit board 226 can include additional circuitry. In yet another configuration, not specifically shown, the circuit board 226 can be a circuit board of an electrical component such as the first electronic component 14 or the second electronic component 18 for example.

Figure 3:
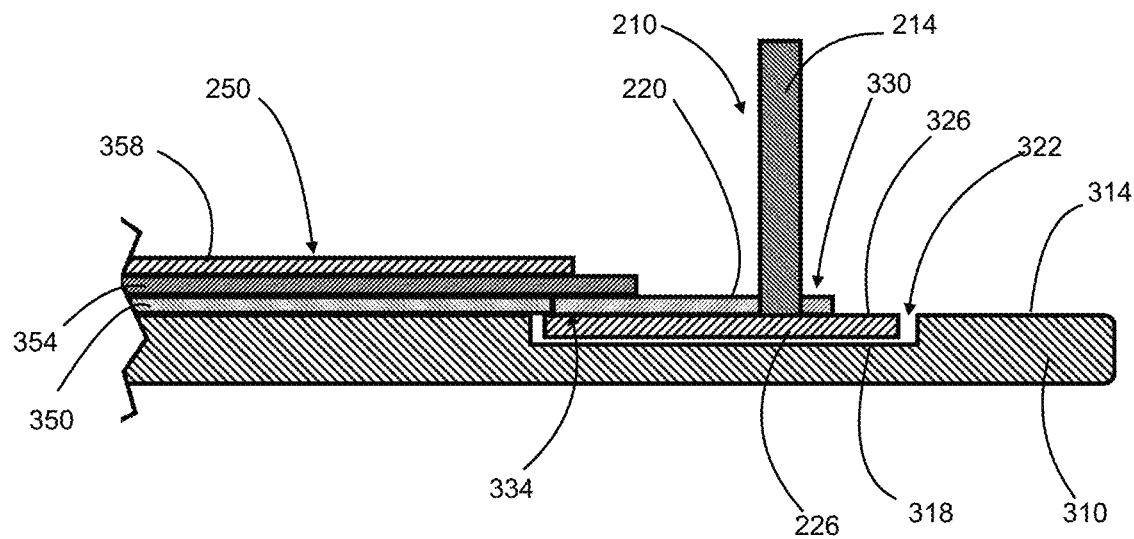
FIG. 3 is a cross-sectional view of the terminal portion of FIG. 2.

Referring to FIG. 3, a cross-section of the connector 210 is illustrated taken along one of the conductive traces 220a, 220b, 220c, 220d, 220e and terminal pins 214a, 214b, 214c, 214d, 214e (the conductive traces 220a, 220b, 220c, 220d, 220e and terminal pins 214a, 214b, 214c, 214d, 214e are respectively referred to hereinafter using the generic reference numerals 220 and 214 when referring to features common among the conductive traces 220a, 220b, 220c, 220d, 220e or among the terminal pins 214a, 214b, 214c, 214d, 214e). The circuit board 226 is mounted on a substrate 310. The substrate 310 can be one of the panels 50, 54, 58.

In one form, the substrate 310 is an electrically conductive material (e.g., metal). In another form, the substrate 310 is a dielectric material (e.g., dielectric plastic or composite). In the example provided, the substrate 310 has an outer surface 314 and a recessed surface 318 that is recessed from the outer surface 314 to define a recess 322. In the example provided, the circuit board 226 is received in the recess 322 and fixed to the substrate 310 such that an outer surface 326 of the circuit board 226 is approximately flush with the outer surface 314 of the substrate 310. While not specifically illustrated, the opposite end of the electrical leads portion 22 can be coupled to another connector that can be similar to the connector 210.

The conductive traces 220 are fixed to the circuit board 226. In the example provided, the conductive traces 220 are flat copper traces on the circuit board 226. In the example provided, the conductive traces 220 are spaced apart and extend parallel to each other along the circuit board 226. Each conductive trace 220 can have a first end portion 330 and a second end portion 334.

Each terminal pins 214 is fixedly coupled to the first end portion 330 of a corresponding one of the conductive traces 220 for electrical communication therewith. Each terminal pins 214 extends from the first end portion 330 of the corresponding conductive trace 220 such that the terminal pins 214 are configured to be connected to a mating connector (not shown) for electrical communication therewith.

Referring to FIG. 2, the electrical leads portion 22 includes a corresponding plurality of electrical pathways 250a, 250b, 250c, 250d, 250e (the electrical pathways 250a, 250b, 250c, 250d, 250e are referred to herein with the generic reference numeral 250 when referring to features common among the electrical pathways 250a, 250b, 250c, 250d, 250e). Each electrical pathway 250 is coupled for electrical communication with a corresponding one of the conductive traces 220.

Figure 4:
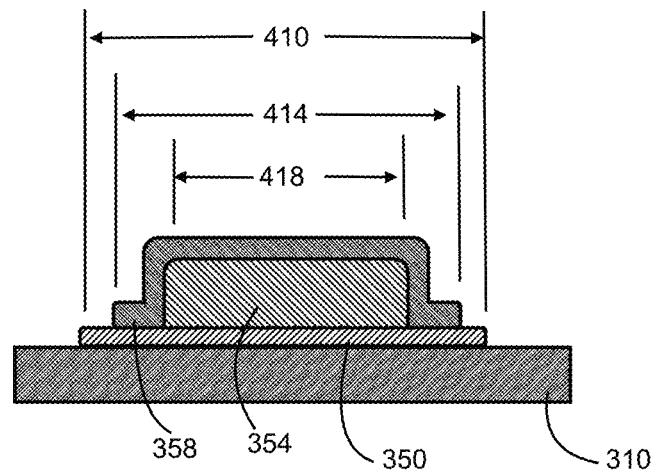
FIG. 4 is a cross-sectional view of layers of tape of the electrical circuit of FIG. 1 in accordance with the teachings of the present disclosure.

With additional reference to FIGS. 3 and 4, each electrical pathway 250 includes a first or base dielectric trace 350, a conductive trace 354, and a second or outer dielectric trace 358. The base dielectric trace 350 is between the outer surface 314 of the substrate 310 and the conductive trace 354. The conductive trace 354 is sandwiched between the base dielectric trace 350 and the outer dielectric trace 358.

As described in greater detail below, application of the base dielectric trace 350, the outer dielectric trace 358, and the conductive trace 354 can be independently controlled such that the base dielectric trace 350, the outer dielectric trace 358, and the conductive trace 354 can terminate at different locations on the connector 210 or substrate 310. Referring to FIG. 3, the base dielectric trace 350 may begin on the outer surface 326 of the circuit board 226 and continue onto the outer surface 314 of the substrate 310, though other configurations may be used such as overlapping a portion of the conductive trace 220 for example. The conductive trace 354 begins on the second end portion 334 of the corresponding conductive trace 220 of the connector 210 such that the conductive trace 354 contacts the corresponding conductive trace 220 for electrical communication therewith. The outer dielectric trace 358 is disposed over the conductive trace 354 and may extend over a portion of the circuit board 226, though other configurations can be used.

Figure 5:
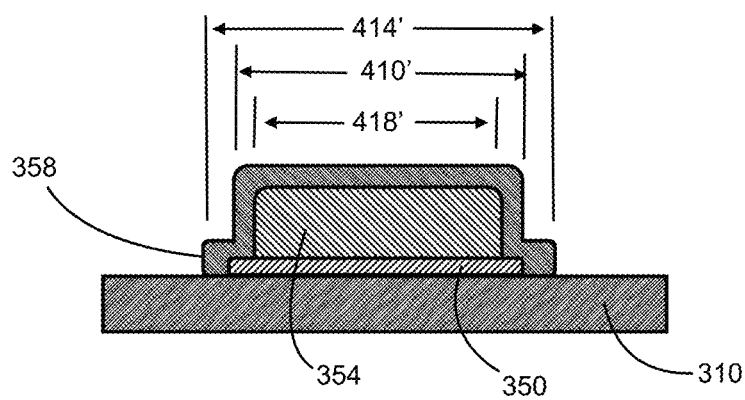
FIG. 5 is a cross-sectional view of layers of tape of an electrical circuit of a second construction in accordance with the teachings of the present disclosure.

Referring to FIG. 4, the conductive trace 354 is completely surrounded by the base and outer dielectric traces 350, 358 except where the conductive trace 354 contacts the conductive trace 220 of the connector 210. In the example provided, the base dielectric trace 350 has a width 410, the outer dielectric trace 358 has a width 414 that is less than the width 410 of the base dielectric trace 350, and the conductive trace 354 has a width 418 that is less than the width 414 of the outer dielectric trace 358. Thus, the conductive trace 354 is insulated from electrical communication with the substrate 310 and from contact from other components (not shown) above the substrate 310. Referring to FIG. 5, another example configuration is illustrated in which the base dielectric trace 350 has a width 410', the conductive trace 354 has a width 418' that is less than the width 410' of the base dielectric trace 350, and the outer dielectric trace 358 has a width 414' that is greater than the width 410' of the base dielectric trace 350.

Figure 6:
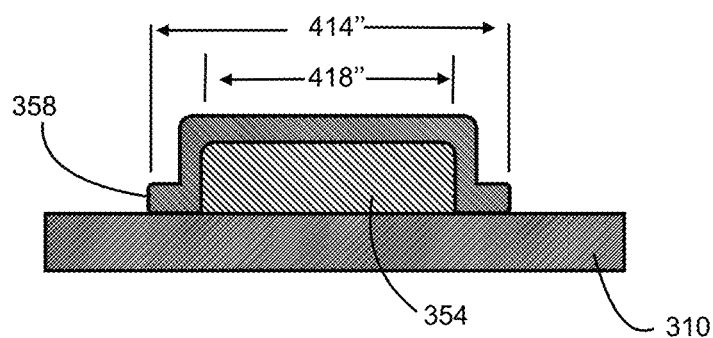
FIG. 6 is a cross-sectional view of layers of tape of an electrical circuit of a third construction in accordance with the teachings of the present disclosure.

The configurations shown in FIGS. 4 and 5 may be used on substrates that are made from electrically insulating material but can also be used on substrates made from electrically conductive, such as metal for example, since the base dielectric trace 350 insulates the conductive trace 354 from the substrate 310. Referring to FIG. 6, an alternative configuration is illustrated in which the substrate 310 is an electrically insulating material and the base dielectric trace 350 (FIGS. 3-5) is not needed. In this configuration, the conductive trace 354 can be applied directly to the substrate 310 and is sandwiched between the substrate 310 and the outer dielectric trace 358. In this configuration, the conductive trace 354 has a width 418" that is less than a width 414"

of the outer dielectric trace 358 such that the conductive trace 354 is entirely covered by the outer dielectric trace 358 along the substrate 310.

Figure 7:
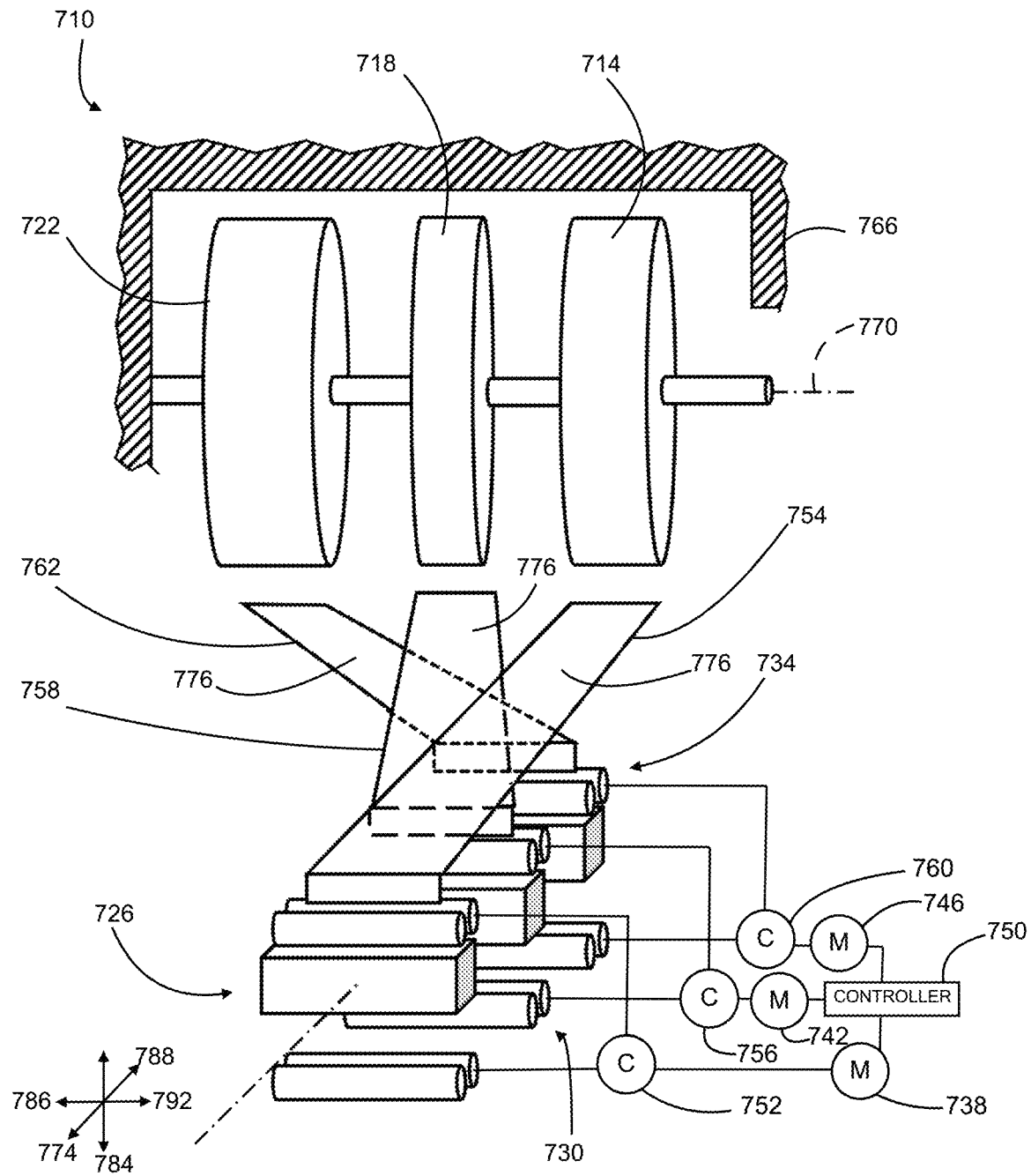
FIG. 7 is a schematic perspective view of a device for applying tapes of the electrical circuit of FIG. 1 in accordance with the teachings of the present disclosure.
Figure 8:
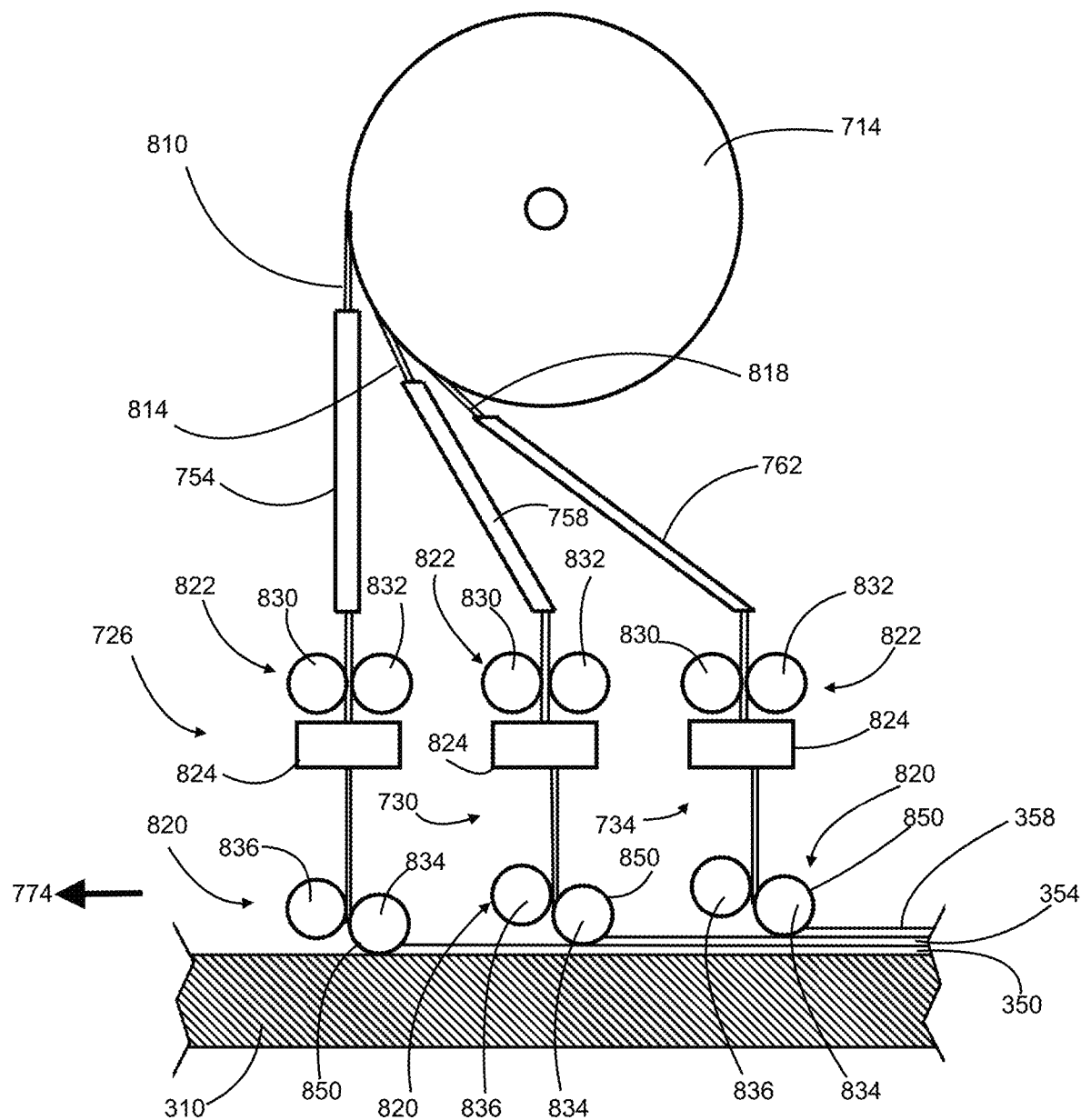
FIG. 8 is a schematic side view of the device of FIG. 7 applying the tapes of the electrical circuit to the vehicle component of FIG. 1 in accordance with the teachings of the present disclosure.

Referring to FIGS. 7 and 8, a device 710 for applying the electrical leads portion 22 to the connector 210 (FIGS. 2 and 3) and the substrate 310 is illustrated. The device 710 includes a plurality of reels (e.g., a first reel 714, a second reel 718, and a third reel 722), a corresponding plurality of applicators (e.g., a first applicator 726, a second applicator 730, and a third applicator 734), a plurality of motors (e.g., a first motor 738, a second motor 742, and a third motor 746), and a controller 750. In the example provided, the device also may include one or more guide members (e.g., a first guide member 754, a second guide member 758, and a third guide member 762). The device 710 can also include a housing 766 that can support the reels 714, 718, 722, applicators 726, 730, 734, and guide members 754, 758, 762 for movement relative to the substrate 310.

The first reel 714 is configured to hold a first tape 810 wound about a reel axis 770, the first tape 810 being of the material making up the base dielectric trace 350. The second reel 718 is configured to hold a second tape 814 wound about the reel axis 770, the second tape 814 being of the material making up the conductive trace 354. The third reel 722 is configured to hold a third tape 818 wound about the reel axis 770, the third tape 818 being of the material making up the outer dielectric trace 358. In the example provided, the first, second, and third reels 714, 718, 722 are coaxial about the reel axis 770, though other configurations can be used. In the example provided, the reel axis 770 is perpendicular to a direction 774 along which the tapes 810, 814, 818 are being applied to the substrate 310, though other configurations can be used. In the example provided, the reels 714, 718, 722 are different sizes corresponding to the different widths 410, 414, 418 (FIG. 4) of the traces 350, 354, 358.

Each applicator 726, 730, 734 can include a corresponding set of application rollers 820, a corresponding set of feed rollers 822 and a corresponding cutter 824. In the example provided, each set of feed rollers 822 includes a first feed roller 830 and a second feed roller 832 and each set of application rollers 820 includes a first application roller 834 and a second application roller 836. Each tape 810, 814, 818 extends from its corresponding reel 714, 718, 722 and passes between the corresponding first feed roller 830 and second feed roller 832 such that the first feed roller 830 contacts one side of that tape 810, 814, 818 and the second feed roller 832 contacts the other side of that tape 810, 814, 818.

At least one of the feed rollers 830, 832 of each set is drivingly coupled to a corresponding one of the motors 738, 742, 746 such that operation of that motor 738, 742, 746 rotates that set of feed rollers 822 to pull the tape 810, 814, 818 from its reel 714, 718, 722 and push the tape 810, 814, 818 through the corresponding cutter 824 and to the corresponding application rollers 834, 836. Each first feed roller 830 may optionally be in contact with the corresponding second feed roller 832 and may optionally be formed of a resilient material such that the tape 810, 814, 818 may be compressed between the first and second feed rollers 830, 832. The feed rollers 830, 832 are all longitudinally parallel to each other and, in the example provided are all perpendicular to the direction 774 of application (i.e., their respective rotational axes are parallel to each other and perpendicular to the direction 774).

The application rollers 834, 836 are all longitudinally parallel to each other and are all perpendicular to the direction 774 of application (i.e., their respective rotational axes are parallel to each other and perpendicular to the direction 774). Each set of application rollers 820 is configured to receive the corresponding tape 810, 814, 818 from the corresponding cutter 824 and apply it to the substrate 310. The first application roller 834 has an application surface 850 (e.g., the outer cylindrical surface of the roller, also referred to herein as the pressure surface) that is configured to press the corresponding tape 810, 814, 818 toward the substrate 310. Each second application roller 836 is spaced apart from the substrate 310 such that it does not contact the substrate 310 during application. Each first application roller 834 may optionally be in contact with the corresponding second application roller 836 and may optionally be formed of a resilient material such that the tape 810, 814, 818 may be compressed between the first and second application rollers 834, 836. In the example provided, at least one of the application rollers 834, 836 of each set is drivingly coupled to the same motor 738, 742, 746 as its corresponding feed rollers 830, 832, such as through a corresponding torque distribution device 752, 756, 760 (e.g., a clutch) configured to selectively transmit rotary power in a first mode in which the set of feed rollers 822 are rotated, in a second mode in which the set of application rollers 820 are rotated, or in a third mode in which the set of feed rollers 822 and the set of application rollers 820 such that rotation of each set of feed rollers 822 is synchronized (e.g., at the same speed) with the rotation of the corresponding application rollers 834, 836.

Figure 10:
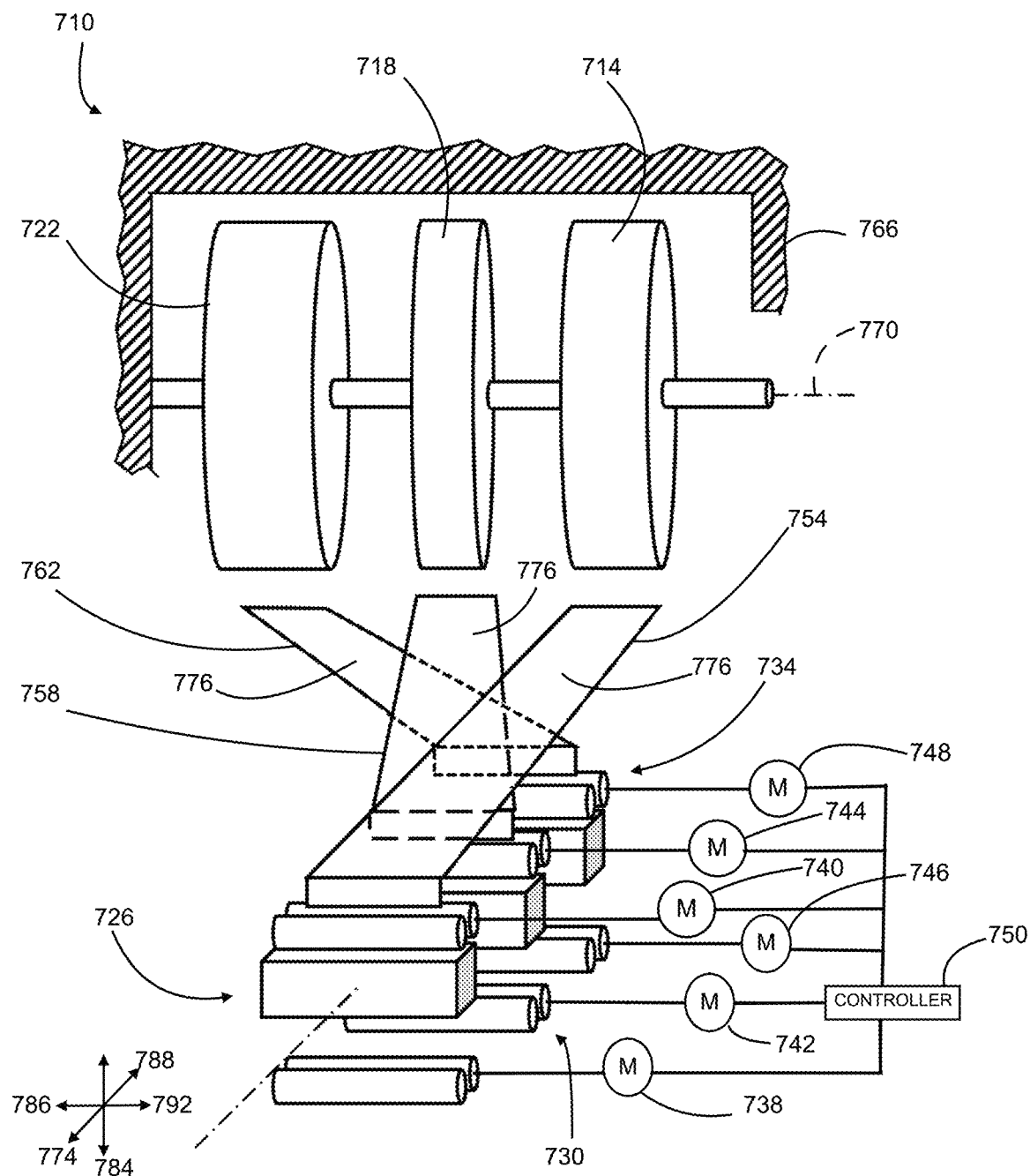
FIG. 10 is schematic perspective view of a device for applying tapes of the electrical circuit of FIG. 1 of a second configuration in accordance with the teachings of the present disclosure.

In an alternative configuration, shown in FIG. 10, each set of feed rollers 822 (labeled in FIG. 8) can be drivingly coupled to a corresponding feed motor 740, 744, 748 that is separate from the motor 738, 742, 746 driving the application rollers 830, 832 (labeled in FIG. 8) and the controller 750 can operate the motor 738, 742, 746 independently of the feed motor 740, 744, 748 in the first and second mode and when in the third mode, controller 750 can synchronize operation of the motor 738, 742, 746 with the corresponding feed motor 740, 744, 748 for each tape 810, 814, 818 (labeled in FIG. 8).

Returning to FIGS. 7 and 8, each tape 810, 814, 818 passes through a corresponding one of the cutters 824 between the corresponding feed rollers 830, 832 and application rollers 834, 836. Each cutter 824 is configured to cut the tape 810, 814, 818 upon activation by the controller 750.

The controller 750 is in communication with the motors 738, 742, 746 and the cutters 824. The controller 750 can be configured to operate the motors 738, 742, 746 independently of each other and can operate the cutters 824 independently of each other such that starting and stopping of application of each tape 810, 814, 818 and severing of each tape 810, 814, 818 can be independently controlled.

The application rollers 834, 836 are all aligned in the application direction 774 such that as the device 710 moves in the application direction 774, the first tape 810 can be applied directly to the substrate 310 as the base dielectric trace 350, the second tape 814 can be applied over the base dielectric trace 350 as the conductive trace 354, and the third tape 818 can be applied over the conductive trace 354 as the outer dielectric trace 358. Since the controller 750 can control application of the tapes 810, 814, 818 independently, the second tape 814 can begin to be applied first, such as while the corresponding application rollers 834, 836 are over the conductive trace 354 (FIG. 3) to ensure electrical contact therewith, and then the first and second tapes 814, 818 can begin to be applied subsequently as needed.

Additionally, in order to achieve the configuration shown in FIG. 6, the first tape 810 may be controlled such that it is not be applied. Alternatively, another device (not specifically shown) may be used that is similar to the device 710 except that it does not include the first reel 714, the corresponding set of feed rollers 822, the corresponding set of application rollers 820, and the corresponding cutter 824.

Each guide member 754, 758, 762, also referred to herein as guide ramps, has a generally flat guide surface 776 that can guide the corresponding tape 810, 814, 818 from its reel 714, 718, 722 to its feed rollers 830, 832. One end of each guide member 754, 758, 762 can be proximate the corresponding reel 714, 718, 722 and the guide member 754, 758, 762 can extend longitudinally such that the opposite end is proximate the corresponding feed rollers 830, 832. Each guide member 754, 758, 762 can guide its tape 810, 814, 818 along two or three dimensional movement from the reel 714, 718, 722 to the set of feed rollers 820 for the corresponding applicator 726, 730, 734. In the example provided, the guide member 754 guides the first tape 810 in the directions 784 and 786, the guide member 758 guides the second tape 814 in the directions 784 and 788, and the guide member 762 guides the third tape 818 in the directions 784, 788, and 792, though other configurations can be used depending on the alignment of the reels 714, 718, 722 relative to the feed rollers 830, 832. Furthermore, one or more of the guide members 754, 758, 762 may be omitted if the corresponding reel 714, 718, 722 is already aligned with the applicator 726, 730, 734.

Figure 9:
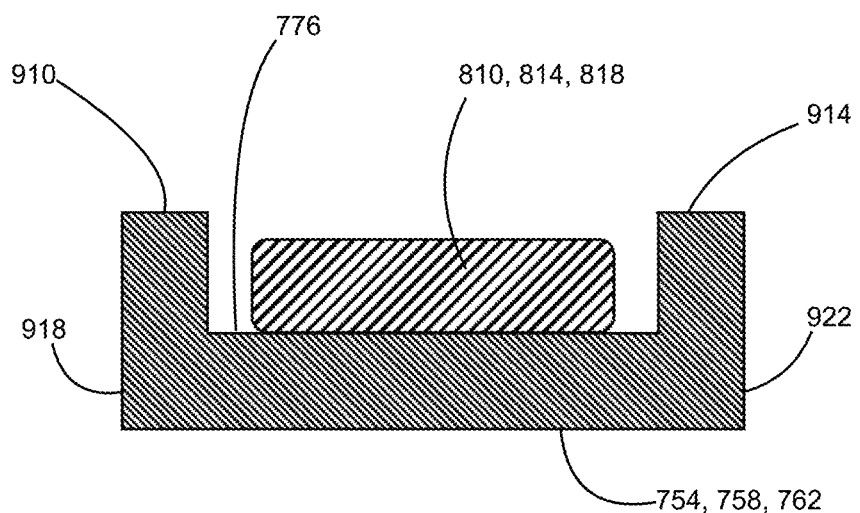
FIG. 9 is a cross-sectional view of a ramp of the device of FIG. 7 in accordance with the teachings of the present disclosure.

Referring to FIG. 9, each guide member 754, 758, 762 can optionally include one or more side walls 910, 914 such that the guide member 754, 758, 762 can define a track or trough shape to retain the tape 810, 814, 818 on the guide surface 776. The side walls 910, 914 can extend from opposite lateral sides 918, 922 of the guide surface 776.

Accordingly, the present disclosure provides for electrical leads integrated into vehicle panels and a device for applying a plurality of tapes in layers onto vehicle panels to form the integrated electrical leads on the vehicle panels, reducing the envelope required for electrical circuits running between components in different locations within the vehicle and permitting electrical circuits to be formed along pathways that may otherwise be too narrow for traditional wiring.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for applying a plurality of individual tapes in layers onto a substrate, the apparatus comprising:
a plurality of reels including a first reel configured to hold a first tape and a second reel configured to hold a second tape;
a plurality of applicators including a first applicator and a second applicator, the first applicator including a first pressure surface configured to receive the first tape from the first reel and press the first tape in a direction toward the substrate to apply the first tape to the substrate, the second applicator including a second pressure surface configured to receive the second tape from the second reel, the second pressure surface aligned to dispense the second tape over a section of the first tape applied to the substrate and to press the second tape in the direction toward the substrate to apply the second tape to the substrate over the first tape; and
at least one guide member disposed between the plurality of reels and the plurality of applicators and configured to align the first and second tapes during application,
wherein the first applicator includes a pair of first application rollers, wherein the first pressure surface is a cylindrical surface of one of the pair of first application rollers, wherein the pair of first application rollers are positioned to compress the first tape between the first pressure surface and a cylindrical surface of a second one of the pair of first application rollers, wherein the second applicator includes a pair of second application rollers, wherein the second pressure surface is a cylindrical surface of a one of the pair of second application rollers, wherein the pair of second application rollers are positioned to compress the second tape between the second pressure surface and a cylindrical surface of a second one of the pair of second application rollers.

2. The apparatus according to claim 1 further comprising a first cutter disposed between the first reel and the first applicator and configured to cut the first tape, and a second cutter disposed between the second reel and the second applicator and configured to cut the second tape.

3. The apparatus according to claim 2 further comprising a controller configured to control the first cutter and the second cutter independently of each other.

4. The apparatus according to claim 2 further comprising a pair of first feed rollers and a pair of second feed rollers, the first feed rollers being disposed between the first reel and the first cutter and configured to feed the first tape into the first cutter, at least one of the first feed rollers being motorized, the second feed rollers being disposed between the second reel and the second cutter and configured to feed the second tape into the second cutter, at least one of the second feed rollers being motorized.

5. The apparatus according to claim 1, wherein the at least one guide member includes a first guide member that extends from the first reel toward the first applicator and a second guide member that extends from the second reel to the second applicator.

6. The apparatus according to claim 5, wherein the first guide member, the second guide member, or both the first guide member and the second guide member has a guide surface along which the first tape or the second tape slides and a guide wall that extends from the guide surface to define a guide track.

7. The apparatus according to claim 1 further comprising the first tape and the second tape, wherein one of the first tape and the second tape is a conductive material and the other of the first tape and the second tape is a dielectric material.

8. The apparatus according to claim 1, wherein the first applicator further includes a first motor drivingly coupled to at least one roller of the pair of first application rollers, wherein the second applicator further includes a second motor drivingly coupled to at least one roller of the pair of second application rollers.

9. The apparatus according to claim 8 further comprising a controller configured to control the first motor independently of the second motor.

10. The apparatus according to claim 8 further comprising a pair of first feed rollers and a pair of second feed rollers, the first feed rollers being disposed between the first reel and a first cutter and configured to feed the first tape into the first cutter, at least one of the first feed rollers being motorized, the second feed rollers being disposed between the second reel and a second cutter and configured to feed the second tape into the second cutter, at least one of the second feed rollers being motorized.

11. The apparatus according to claim 1, wherein the first reel and the second reel are coaxially disposed about a reel axis, wherein each roller of the pair of first application rollers and each roller of the pair of second application rollers is disposed about a corresponding roller axis that is parallel to the reel axis.

12. The apparatus according to claim 1, wherein the first reel is configured to hold tape of a first width and the second reel is configured to hold tape of a second width that is greater than the first width.

13. The apparatus according to claim 12, wherein the plurality of reels includes a third reel configured to hold a third tape of a third width that is greater than the first width, wherein the plurality of applicators includes a third applicator including a third pressure surface configured to receive the third tape from the third reel and to press the third tape in the direction toward the substrate to apply the third tape to the substrate, wherein the first applicator is configured to align the first tape over a section of the third tape applied to the substrate, wherein the apparatus further comprising a third tape cutter configured to cut the third tape.

14. The apparatus according to claim 13 further comprising the first tape, the second tape, and the third tape, wherein the third tape is a dielectric material, the first tape is a conductive material, and the second tape is a dielectric material.

15. An apparatus for applying a plurality of individual tapes in layers onto a substrate, the apparatus comprising:
a plurality of reels including a first reel holding a first tape wound about the first reel and a second reel holding a second tape wound about the second reel;
a plurality of applicators including:
a first applicator including a first application roller and a first motor drivingly coupled to the first application roller and configured to draw the first tape from the first reel onto a first pressure surface of the first application roller, the first pressure surface being disposed about a first axis and configured to apply the first tape to the substrate; and
a second applicator including a second application roller and a second motor drivingly coupled to the second application roller and configured to draw the second tape from the second reel onto a second pressure surface of the second application roller, the second pressure surface being disposed about a second axis that is parallel to the first axis, the second pressure surface being aligned with the first pressure surface in an application direction to apply the second tape to the substrate over the first tape;

at least one guide ramp disposed between the plurality of reels and the plurality of applicators and configured to align the first and second tapes during application;

a first cutter disposed between the first reel and the first applicator and configured to cut the first tape; and a second cutter disposed between the second reel and the second applicator and configured to cut the second tape, wherein one of the first tape and the second tape is an electrically conductive material and the other of the first tape and the second tape is a dielectric material.

16. The apparatus according to claim 15 further comprising a controller in communication with the first motor, the second motor, the first cutter, and the second cutter, wherein the controller is configured to control the first motor and the second motor independently of each other and to control the first cutter and the second cutter independently of each other.

17. The apparatus according to claim 15, wherein the first reel and the second reel are coaxially disposed about a reel axis, wherein the first axis and the second axis are parallel to the reel axis.

18. The apparatus according to claim 15 further comprising a pair of first feed rollers and a pair of second feed rollers, the first feed rollers being disposed between the first reel and the first cutter and configured to feed the first tape into the first cutter, at least one of the first feed rollers being motorized, the second feed rollers being disposed between the second reel and the second cutter and configured to feed the second tape into the second cutter, at least one of the second feed rollers being motorized.

19. The apparatus according to claim 15, wherein the plurality of reels includes a third reel holding a third tape wound about the third reel, wherein the plurality of applicators includes a third applicator including a third application roller and a third motor drivingly coupled to the third application roller and configured to draw the third tape from the third reel onto a third pressure surface of the third application roller, the third pressure surface being disposed about a third axis that is parallel to the first axis and the second axis, wherein the first pressure surface is aligned with the third pressure surface in the application direction and disposed between the second pressure surface and the third pressure surface in the application direction.

20. An apparatus for applying a plurality of individual tapes in layers onto a substrate, the apparatus comprising:

a plurality of reels including a first reel configured to hold a first tape and a second reel configured to hold a second tape; and a plurality of applicators including:

a first applicator including a first application roller defining a first pressure surface disposed about a first axis and configured to apply the first tape to the substrate; and a second applicator including a second applicator roller defining a second pressure surface disposed about a second axis that is parallel to the first axis, the second pressure surface being aligned with the first pressure surface in an application direction to apply the second tape to the substrate over the first tape, wherein the first and second application rollers are motor driven to draw the first tape from the first reel onto the first pressure surface and to draw the second tape from the second reel onto the second pressure surface.

* * * * *